United States Patent Office 3,504,884
Patented Apr. 7, 1970

---

3,504,884
PRESSURE RELIEVED VALVE
Nicolaas Jacobus Mokveld, Gouda, Netherlands, assignor to N.V. Machinefabriek Mokveld, Gouda, Netherlands, a corporation of the Netherlands
Filed Sept. 25, 1967, Ser. No. 670,089
Int. Cl. F16k 25/00, 1/00
U.S. Cl. 251—172                                5 Claims

ABSTRACT OF THE DISCLOSURE

The present invention relates to a pressure relieved valve for use with very high pressures. To obtain low operating forces and a real tight sealing use is made of a sealing ring circumferentially protruding from an annular recess in the sealing part and adapted to engage the cylindrical surface of the flow passage. The annular recess is connected with the spaces in front and behind the sealing ring, when in its closing position, by channels opening into said recess at a location radially inwardly of the annular sealing ring. The space of the recess under said ring contains means, such as a ring of soft resilient material, to close the channel towards the low pressure side and press the annular sealing ring aganist the cylindrical surface of the flow passage.

BACKGROUND OF THE INVENTION

The invention relates to a pressure relieved valve in particular a valve which can be used under very high pressure conditions and differential pressures and further needs low operation forces to open and close the valve notwithstanding the existing high pressures and differential pressures. The pressure level is up to 600 atmospheres and may even be more.

Pressure relieved valves are valves which stop or admit the flow of a fluid by means of a pressure balanced sealing piston. The pressure balancing is obtained in a well known way by the pressure operating on two opposite equal areas of the sealing piston.

Although this principle allows opening and closing the valve very easily it remains extremely difficult to obtain a real tight sealing of the valve.

SUMMARY OF THE INVENTION

According to the invention this is achieved in that there is a non equalized connection between the space under the sealing ring and both inlet and outlet of the valve. By means of this connection the fluid pressure may press said ring outwardly against the cylindrical surface. Preferably the space under the sealing ring is partly filled with an O-shaped ring or ring of any other cross section of soft resilient material e.g. a rubber ring which in a radial direction is closing the space under the sealing ring to avoid an open connection between the inlet and outlet side of the valve. When the sealing part is moved into its closing position the pressure will press the sealing ring outward e.g. by moving the O-shaped rubber ring into the end position in the space behind the sealing ring in which position the O-shaped ring is deformed by the pressure. This deformation has a radial component pressing the sealing ring outwardly. Said sealing ring also is of resilient material but of considerable greater stiffness and hardness than the O-shaped ring. Instead of O-shaped said ring may have a different cross section e.g. trapezoidal.

BRIEF DESCRIPTION OF THE DRAWINGS

The invention now will be further elucidated with reference to the drawings.

DETAILED DESCRIPTION OF THE INVENTION

Figure 1:
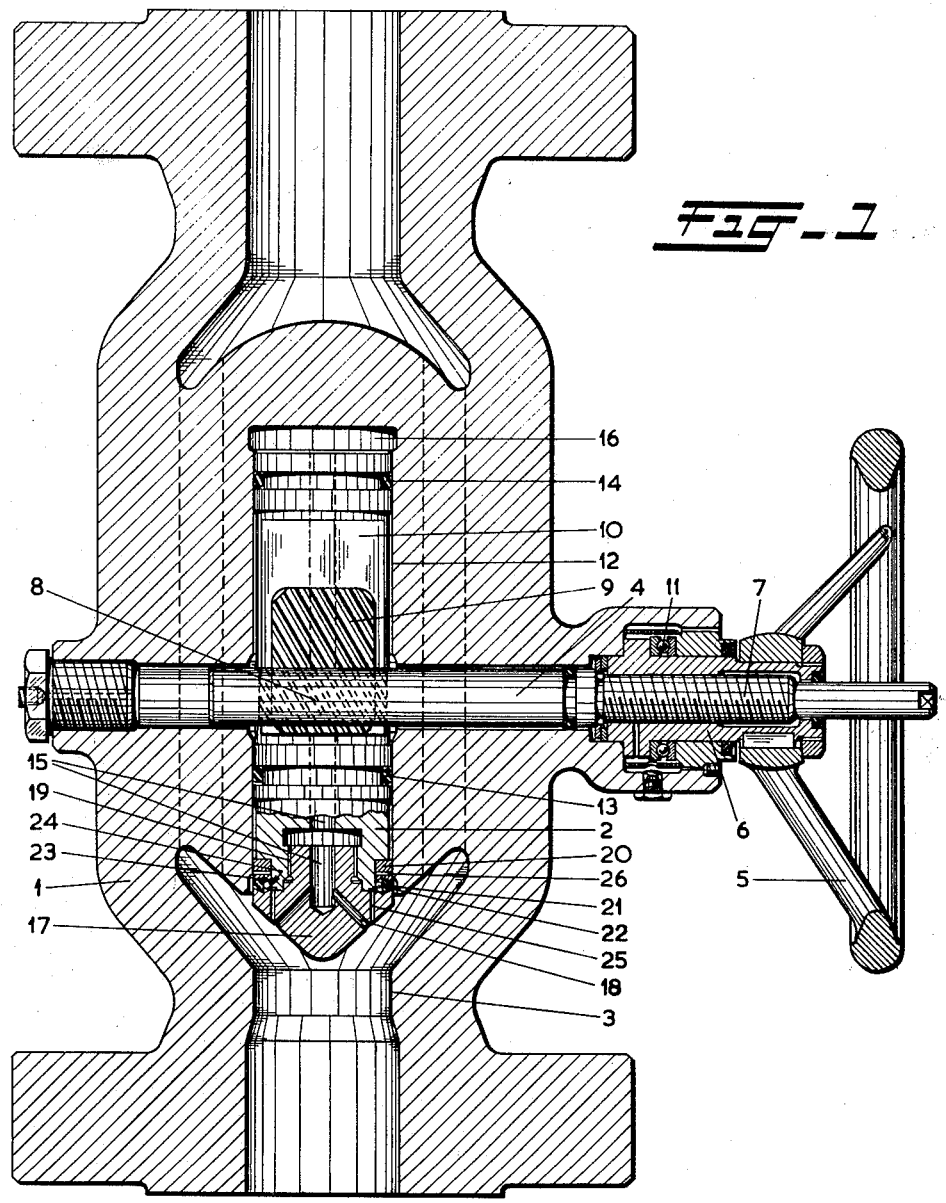
FIG. 1 is a cross section to a pressure relieved valve according to the invention.

The valve shown in FIG. 1 has a valve housing 1 with a sealing part 2 axially movable into and out of the cylindrical passage 3.

To move the sealing part 2 a spindle 4 has been provided which is movable by means of a hand wheel 5, secured to a yoke bushing 6 which is provided with an inner screw thread engaging a screw threaded top end 7 of the spindle 4. The valve spindle 4 is a stem which, by means of the screw thread of the parts 6 and 7, may be moved upwardly and downwardly without rotating about its vertical axis. Said stem has a toothed surface indicated by the lines 8, engaging a correspondingly toothed part 9 of an extension 10 of the sealing part 2. The bushing 6 is rotatably supported by means of a ball bearing 11 in the housing 1. If the hand wheel 5 is rotated in such a way that the stem or spindle 4 is moved to the left the sealing part will slide into the cylindrical seat 3. The sealing part is guided in a cylindrical bore 12 of the housing 1 and sealed with respect to said bore by means of sealing rings 13 and 14 which rings may be so called O-rings or rings of other cross-sectional shape. The sealing part has a central channel 15 so that in the closed position, the fluid pressure not only operates on the underside of the sealing part but also in the space 16 on the upper side. As the areas of head 17 and extension 10 are equal, the sealing part is easily moved notwithstanding high pressure differentials.

That part of the sealing part which performs the sealing is formed by a head 17 with channels 18 connecting the space in front of said head with the channel 15 and is secured to the sealing part 2 by means of screw thread 19. Between the head 17 and a ring 20 an annular space is formed in which a sealing ring 21 has been provided made from a relatively stiff resilient material. Said space has the form of an isosceles trapezoid in cross section. On the inner side of the sealing ring 21 an O-shaped ring 22 has been provided which does not fill up the space having a trapezoidal cross section under the sealing ring 21 but is in engagement with the inner surface of said sealing ring 21 and with the most inner surface of said annular recess 23 formed by the outer surface 24 of the sealing part 2. According to the invention there is always a connection between the inlet and outlet side of the valve and the annular space 23. This may be obtained by the channels 25 and 26.

Figure 2:
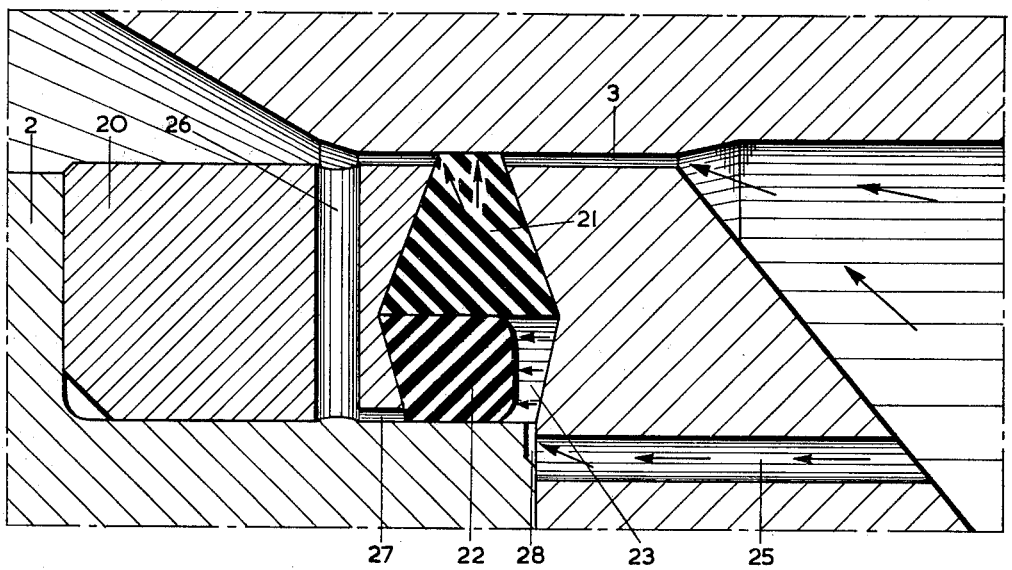
FIGS. 2 and 3 are cross sections at an enlarged scale of a part of the sealing part in its closing position to show the operation.
Figure 3:
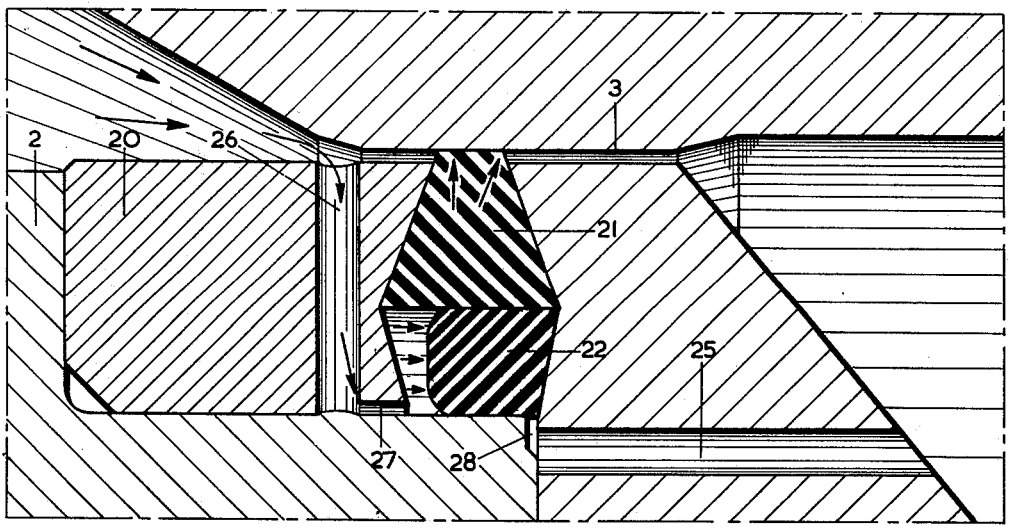

In the closing position shown in the FIGURES 2 and 3 the sealing ring 21 engages the inner surface of the cylindrical passage 3. FIG. 2 shows the position with pressure to the right side of the sealing part which pressure enters the space 23 through channel 25 and presses the ring 22 to the left. Due to the high pressure differential said ring 22 will be deformed as shown in FIG. 2. This deformation not only ensures a complete sealing of the connection 27 and channel 26 but also causes a radially outwardly directed force which presses the sealing ring 21 radially against the cylindrical seat 3.

FIG. 3 shows the situation which occurs when the high pressure comes from the left side. The ring 22 now is pressed in the right corners of the annular space under the sealing ring 21 thereby sealing the connection 28 and the channel 25. The deformation of ring 22 causes, just as described in the foregoing, a radially outwardly directed force which presses the sealing ring 21 against the cylindrical seat 3.

Said radial forces are sufficient to ensure a correct sealing but do not prevent the opening of the valve and certainly do not interfere with the closing because they do not exist as long as the sealing does not take place.

Having described my invention, I claim:

1. A valve comprising a housing part having a flow passage therethrough and a sealing part axially movable with respect to each other, an annular recess disclosed in one of said parts, first annular sealing ring means of resilient material disposed in and provided with a sealing face circumferentially protruding from said recess for sealing engagement with the other of said parts, second annular sealing ring means of resilient material having a greater resiliency than the resilient material of said first sealing ring means disposed in said recess in contact with said first sealing ring means and the bottom of said recess and channel means connecting the high pressure side of said flow passage to said recess adjacent said second sealing ring means, said first sealing ring means, at least in the position when the valve is closed, being disposed in fluid-tight engagement with said recess to prevent the passage of fluid from said recess into said flow passage past said first sealing ring means, said first sealing ring means and the portion of said recess receiving said first sealing ring means having a complementary trapezoidal cross sectional configuration with the circumferential width of the recess opening being the shorter base portion of the trapezoid, said trapezoidal configuration of said recess and said first sealing ring means presenting side portions disposed at angles relative to the base portions of the trapezoidal configuration sufficient to retain said first sealing ring means substantially within said recess upon application of high radially directed pressures on said first sealing ring means tending to force said first sealing ring means out of said recess.

2. A valve according to claim 1, characterized in that said annular recess is connected by a second channel to the low pressure side of said flow passage, said second channel communicating with that recess at a location radially beween the said first sealing ring and the bottom of the recess, the two channels communicating with the recess on opposite sides of the second sealing ring in the axial direction.

3. A valve according to claim 2, characterized in that the annular recess in cross section has two trapezoidal parts having the longer of the parallel sides upon each other and the shorter of said sides forming the opening and bottom of said recess, the channel means on both sides of the second sealing ring being located adjacent to the bottom of the recess.

4. A valve according to claim 1, characterized in that the portion of said recess containing said second sealing ring is trapezoidal in cross section with the longer of the parallel sides corresponding to the base of the other trapezoidal part of the recess.

5. A valve according to claim 1, characterized in that the channel means connecting the recess with the high pressure side of the valve communicate with said recess through a passage of smaller cross section.

References Cited

UNITED STATES PATENTS

| | | | |
|---|---|---|---|
| 2,962,039 | 11/1960 | Shand | 251—172 XR |
| 3,036,587 | 5/1962 | Silver | 251—175 XR |
| 3,156,445 | 11/1964 | Swain | 251—171 |
| 3,203,246 | 8/1965 | Horwitt | 251—175 XR |
| 3,250,510 | 5/1966 | Williams | 251—306 XR |
| 3,282,558 | 11/1966 | Swain | 251—306 XR |

HAROLD W. WEAKLEY, Primary Examiner

U.S. Cl. X.R.

251—175, 334